(12) United States Patent
Devarapalli et al.

(10) Patent No.: US 11,155,743 B2
(45) Date of Patent: Oct. 26, 2021

(54) DE-OILED LOST CIRCULATION MATERIALS

(71) Applicant: Halliburton Energy Services, Inc., Houston, TX (US)

(72) Inventors: V Ramireddy Devarapalli, Pune (IN); Mahesh Vijaykumar Biyani, Pune (IN); Sandeep Vasant Chavan, Pune (IN); Siddharth Roy, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 63 days.

(21) Appl. No.: 16/536,483

(22) Filed: Aug. 9, 2019

(65) Prior Publication Data

US 2021/0040376 A1   Feb. 11, 2021

(51) Int. Cl.

| C09K 8/502 | (2006.01) |
| C09K 8/72 | (2006.01) |
| E21B 21/00 | (2006.01) |
| E21B 37/00 | (2006.01) |
| E21B 33/138 | (2006.01) |

(52) U.S. Cl.
CPC .............. C09K 8/502 (2013.01); C09K 8/72 (2013.01); E21B 21/003 (2013.01); E21B 33/138 (2013.01); E21B 37/00 (2013.01); C09K 2208/04 (2013.01)

(58) Field of Classification Search
CPC .................................................... C09K 8/035
See application file for complete search history.

(56) References Cited

U.S. PATENT DOCUMENTS

| 3,480,084 A * | 11/1969 | Eilers .................. C09K 8/68 166/282 |
| 5,801,127 A * | 9/1998 | Duhon, Sr. ........... C09K 8/06 175/72 |
| 6,016,879 A * | 1/2000 | Burts, Jr. .............. C09K 8/035 166/295 |
| 2008/0107591 A1 | 5/2008 | Cisneros |
| 2011/0278006 A1 | 11/2011 | Sanders et al. |
| 2012/0181034 A1 | 7/2012 | Bour et al. |
| 2015/0072901 A1 | 3/2015 | Samuel et al. |
| 2016/0298018 A1* | 10/2016 | Medvedev ........... C09K 8/514 |
| 2017/0267913 A1* | 9/2017 | Sarda-Mantri ....... C09K 8/68 |

(Continued)

FOREIGN PATENT DOCUMENTS

WO    2016/072985 A1    5/2016

OTHER PUBLICATIONS

Okafor, Development of Palm Oil Extraction System, 2015 (Year: 2015).*

(Continued)

*Primary Examiner* — Angela M DiTrani Leff
*Assistant Examiner* — Avi T Skaist
(74) *Attorney, Agent, or Firm* — Thomas Rooney; Baker Botts L.L.P.

(57) ABSTRACT

De-oiled lost circulation materials and methods of using such materials to, for example, reduce fluid loss are provided. In some embodiments, such methods include introducing a first treatment fluid including a base fluid and a de-oiled plant material into a wellbore penetrating at least a portion of a subterranean formation including a loss zone; and allowing the de-oiled plant material to at least partially plug the loss zone.

12 Claims, 3 Drawing Sheets

(56) References Cited

U.S. PATENT DOCUMENTS

2018/0002589 A1    1/2018  Amanullah
2018/0016483 A1*   1/2018  Amanullah ............ C09K 8/506
2019/0233706 A1*   8/2019  Adewole .................. C09K 8/18

OTHER PUBLICATIONS

International Search Report and Written Opinion issued in related PCT Application No. PCT/US2019/046266 dated May 8, 2020, 12 pages.

* cited by examiner 200 micron 500 micron 1000 micron

DISSOLUTION OF PARTICULATES IN 5% HCL

DISSOLUTION OF PARTICULATES IN 10% HCL

DISSOLUTION OF PARTICULATES IN 15% HCL

DE-OILED LOST CIRCULATION MATERIALS

BACKGROUND

The present disclosure relates to methods and compositions for using de-oiled lost circulation materials in subterranean formations.

Treatment fluids are used in a variety of operations that may be performed in subterranean formations. As referred to herein, the term "treatment fluid" will be understood to mean any fluid that may be used in a subterranean application in conjunction with a desired function and/or for a desired purpose. The term "treatment fluid" does not imply any particular action by the fluid. Treatment fluids often are used in, e.g., well drilling, completion, and stimulation operations. Examples of such treatment fluids include, inter alia, drilling fluids, well cleanup fluids, workover fluids, conformance fluids, gravel pack fluids, acidizing fluids, fracturing fluids, spacer fluids, and the like.

While drilling a wellbore penetrating a subterranean formation, the drilling fluid being circulated through the wellbore may be lost into the surrounding formation. Fluids are typically lost into the formation through fractures induced by excessive mud pressures, pre-existing open fractures, or large openings with structural strength in the formation. In addition to underground blowouts, cross flow, and loss of hydrostatic pressure, lost circulation can lead to a drill pipe becoming lodged in the wellbore. In some instances, drilling may be terminated to allow for a remedial operation to be performed.

In some drilling operations when lost circulation is observed, the wellbore may be treated with lost circulation materials ("LCM") for plugging the portion of formation through which the fluids are being lost. A variety of LCMs have been used or proposed for arresting lost circulation of drilling fluids. However, certain lost circulation materials are acid insoluble and/or non-biodegradable, limiting the application of those materials in a reservoir or production zone.

Additionally, some LCMs are cost intensive.

BRIEF DESCRIPTION OF THE DRAWINGS

These drawings illustrate certain aspects of some of the embodiments of the present disclosure and should not be used to limit or define the claims.

Figure 1:
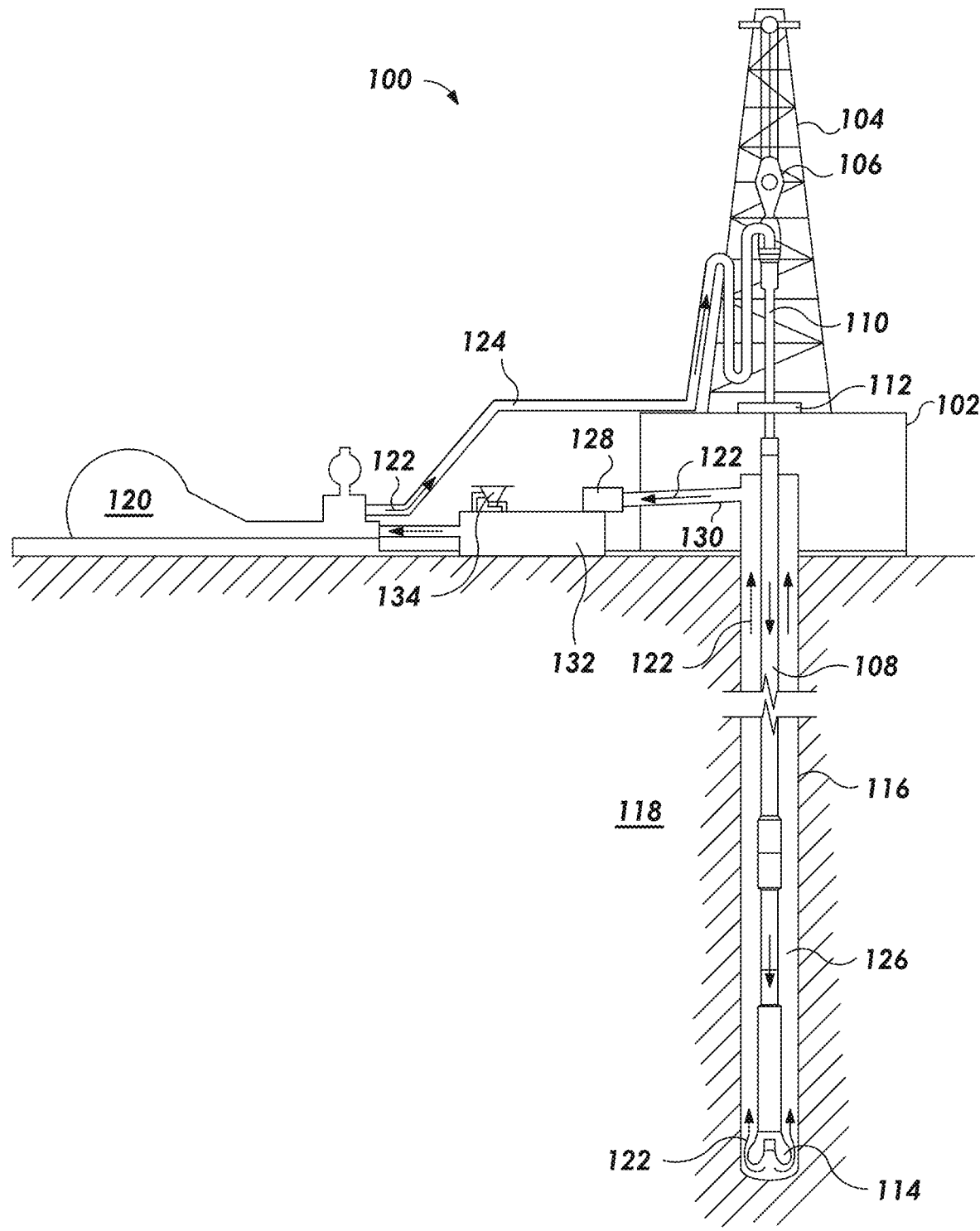
FIG. 1 is a schematic diagram of a system for delivery of lost circulation materials of the present disclosure to a downhole location in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to methods and compositions for use in subterranean formations, and specifically, to de-oiled lost circulation materials and methods for use. More specifically, the present disclosure includes introducing a treatment fluid including a base fluid and a de-oiled plant material from which an edible or non-edible oil has been extracted into a wellbore penetrating at least a portion of a subterranean formation including a loss zone; and allowing the de-oiled plant material to at least partially plug the loss zone. In certain embodiments, the present disclosure includes introducing a first treatment fluid comprising a base fluid and a de-oiled plant material into a wellbore penetrating at least a portion of a subterranean formation; forming a filter cake or a plug comprising at least a portion of the de-oiled plant material in at least the portion of the subterranean formation; introducing a second treatment fluid comprising an acid in the wellbore; and allowing the second treatment fluid comprising an acid to contact at least a portion of the filter cake or plug, wherein at least the portion of the filter cake or plug at least partially degrades in response to contacting the second treatment fluid. In some embodiments, the present disclosure includes a composition including an invert emulsion base fluid and a lost circulation material comprising a de-oiled cake of a plant material from which an edible oil has been extracted.

As used herein, "loss zone" refers to a portion of a subterranean formation into which fluids circulating in a wellbore may be lost. In certain embodiments, loss zones may include voids, vugular zones, wash-outs, lost circulation zones, perforations, natural fractures, induced fractures, and any combination thereof.

In certain embodiments, the de-oiled plant material may be in the form of a powder. In some embodiments, the de-oiled plant material may be a de-oiled cake of peanut and other food-grade degradable solid particulates including, but not limited to a de-oiled cake of coconut, soybean, sunflower, cottonseed, safflower, palm, rapeseed, corn, olive, sesame, almond, walnut, mustard, rice bran, a derivative of any of the foregoing, and any combination thereof.

Among the many potential advantages to the methods and compositions of the present disclosure, only some of which are alluded to herein, the methods, compositions, and systems of the present disclosure may provide an effective lost circulation material that is low cost, widely available, and/or natural. In some embodiments, the de-oiled lost circulation material may be acid soluble and/or biodegradable, allowing for use in a reservoir or production zone. In some embodiments, the de-oiled lost circulation material may include a low cost waste product from the edible oil processing industry or the non-edible oil processing industry. Additionally, in some embodiments, the de-oiled lost circulation material may be a single-product lost circulation solution, as opposed to a lost circulation material that includes a combination of several different products.

A de-oiled lost circulation material may be included in a treatment fluid in accordance with certain embodiments of the present disclosure. The term "lost circulation material" includes, for example, materials that are capable of reducing the amount of fluid that is lost during the drilling process. As used herein "de-oiled material" or "de-oiled plant material" means, for example, a material from which an oil has been extracted. In certain embodiments, a de-oiled plant material may have had at least 99%, at least 95%, at least 90% or at least 85% of the oil extracted therefrom. In some embodiments, the de-oiled plant material may include 10% oil or less, 5% oil or less, 4% oil or less, 3% oil or less, 2% oil or less, 1% oil or less, 0.5% oil or less, all by weight of the material.

In some embodiments, the de-oiled lost circulation material may include a de-oiled plant material. In some embodiments, the de-oiled lost circulation material may include a de-oiled plant material of an edible plant. In certain embodiments, an edible oil has been extracted from the de-oiled plant material. In some embodiments the extraction of the edible oil from the plant material forms a de-oiled cake of a plant material. Examples of plant materials suitable for certain embodiments of the present disclosure include, but are not limited to peanut, coconut, soybean, sunflower, cottonseed, safflower, palm, rapeseed, corn, olive, sesame, almond, walnut, mustard, rice bran, jatropha, microalgae, neem, pongamia, rubber seed, mahua, silk-cotton tree, a derivative of any of the foregoing, and any combination thereof. In some embodiments, the de-oiled lost circulation material is a byproduct or waste product of the edible oil industry or food industry, or a byproduct or waste product of the non-edible oil industry. In some embodiments, the de-oiled lost circulation material (e.g., a de-oiled cake of a plant material) is ground into a powder. In certain embodiments the de-oiled lost circulation material is a powdered cake of a plant material from which an edible oil has been extracted.

In certain embodiments, the de-oiled lost circulation material may be acid soluble. For example, in some embodiments, the de-oiled lost circulation material may at least partially degrade or dissolve in response to contact with an acidic fluid. In certain embodiments, the de-oiled lost circulation material may be biodegradable. For example, in some embodiments, the de-oiled lost circulation material of the present disclosure may be at least partially biodegrade under certain conditions, such as those conditions typically found in subterranean formations.

In some embodiments, the de-oiled lost circulation material may degrade or dissolve in response to a wellbore condition. For example, the de-oiled lost circulation material may dissolve or degrade in response to at least one of a temperature, pressure, pH, salinity, solvency, and/or the presence of enzymes. In certain embodiments, the de-oiled lost circulation material may degrade or dissolve in response to exposure to an aqueous or non-aqueous fluid with an acidic pH. For example, in certain embodiments, a treatment fluid including a de-oiled lost circulation material may be introduced into the wellbore followed by a second treatment fluid including an acidic fluid (e.g., an acidic pill), which may be allowed to contact the de-oiled lost circulation material, triggering the de-oiled lost circulation material to dissolve or degrade. In certain embodiments, the acidic fluid may include an organic acid. In some embodiments, the rate at which the de-oiled lost circulation material degrades or dissolves may depend on the ambient downhole environment to which the de-oiled lost circulation material is subjected (e.g., temperature, presence of moisture, oxygen, microorganisms, enzymes, pH, pressure, the like, and combinations thereof).

In certain embodiments, the de-oiled lost circulation material may be used to form a filter cake and/or plug in at least a portion of a subterranean formation that can be selectively dissolved and removed from the wellbore. In some embodiments, the filter cake and/or plug may be formed in a reservoir or production zone of the subterranean formation. In certain embodiments, a second treatment fluid including an acid is introduced into the subterranean formation and allowed to contact at least a portion of the filter cake or plug. In certain embodiments, at least the portion of the filter cake or plug that contacts the second treatment fluid at least partially degrades in response to contacting the second treatment fluid.

In some embodiments, the powdered de-oiled plant material may include particles of various sizes. In certain embodiments, the de-oiled lost circulation materials of the present disclosure may include particles having an average particle diameter ranging from about 100 microns to about 1,000 microns, from about 200 microns to about 800 microns, or from about 300 microns to about 600 microns.

In certain embodiments, the de-oiled lost circulation material may include particles sized within a range of from about 1,250 U.S. mesh to about 5 U.S. mesh. In some embodiments, the de-oiled lost circulation material may include particles sized within a range of from about 400 U.S. mesh to about 10 U.S. mesh. In some embodiments, the de-oiled lost circulation material includes particles sized 10 U.S. mesh or smaller, sized 12 U.S. mesh or smaller, or sized 18 U.S. mesh or smaller. In certain embodiments, at least 90% of the lost circulation material particles may be sized 4 U.S. mesh or smaller. In certain embodiments, at least 50% of the lost circulation material particles may be sized 30 U.S. mesh or smaller. In certain embodiments, at least 5% of the lost circulation material particles may be sized 100 U.S. mesh or smaller. For example, in some embodiments, the lost circulation material may have a d50 particle size distribution of from about 20 to about 100 U.S. mesh. In certain embodiments, the lost circulation material may exhibit a d50 particle size distribution of 4 U.S. mesh or smaller, 20 U.S. mesh or smaller, 30 U.S. mesh or smaller, or 40 U.S. mesh or smaller. As used herein, references to particle sizes of a particular mesh "or larger" and grammatical equivalents thereof refers to particles of that particular mesh size and particles larger than that size. Similarly, as used herein, references to sizes of a particular mesh "or smaller" and grammatical equivalents thereof refers to particles of that particular mesh size and particles smaller than that size.

In certain embodiments, the de-oiled lost circulation material may include particles having a diameter of 2,000 microns or smaller, 1,700 microns or smaller, or 1,500 microns or smaller. In some embodiments, the de-oiled lost circulation material may include particles having a diameter of from about 1 micron to about 2,000 microns. In certain embodiments, the de-oiled lost circulation material may exhibit a particle size distribution between about 1 micron and about 2,000 microns. For example, in some embodiments, the de-oiled lost circulation material may have a d50 particle size distribution of from about 250 microns to about 1,000 microns. In certain embodiments, the de-oiled lost circulation material may exhibit a d50 particle size distribution of 1,000 microns or smaller, 750 microns or smaller, or 500 microns or smaller.

In certain embodiments, a treatment fluid including a de-oiled lost circulation material may be introduced into a portion of a subterranean formation including at least one microfracture. In certain embodiments, a treatment fluid including a de-oiled lost circulation material may be introduced into a portion of a subterranean formation including at least one microfracture having a fracture width or flow opening size in the range of from about 1 micron to about 2,000 microns or from about 200 microns to about 1,000 microns.

In certain embodiments, the de-oiled lost circulation materials of the present disclosure may exhibit a substantially uniform particle size distribution or a multi-modal particle size distribution. As used herein, lost circulation materials having a "substantially uniform particle size distribution" are materials in which the standard deviation of the particle sizes in a representative sample of the particles is within about 30% of the mean (number) particle size. As used herein, lost circulation materials having a "multi-modal particle size distribution" are materials in which a significant number of particles are of a size an order of magnitude removed from the mean particle size. In certain embodiments, the de-oiled lost circulation materials may include a bimodal or trimodal particle size distribution. In some embodiments, the de-oiled lost circulation materials may be processed by mechanically sizing, cutting or, chopping the de-oiled lost circulation materials into particles using any suitable methodologies for such processes.

In some embodiments, the de-oiled lost circulation material may be present in the treatment fluids in an amount of from about 1% to about 50% by weight of the treatment fluid (e.g., about 1%, about 5%, about 10%, about 15%, about 20%, about 25%, about 30%, about 35%, about 40%, about 45%, about 50%, etc.). In some embodiments, the de-oiled lost circulation material may be present in the treatment fluid in an amount of from about 1% to about 25% by weight of the treatment fluid. In some embodiments, the de-oiled lost circulation material may be present in an amount of from about 10% to about 25% by weight of the treatment fluid. In some embodiments, the de-oiled lost circulation material may be present in the treatment fluids in an amount of from about 1 pound per barrel (ppb) to about 100 ppb (e.g., to about 1 ppb, about 5 ppb, about 10 ppb, about 15 ppb, about 20 ppb, about 25 ppb, about 30 ppb, about 35 ppb, about 40 ppb, about 45 ppb, about 50 ppb, about 55 ppb, about 60 ppb, about 65 ppb, about 70 ppb, about 75 ppb, about 80 ppb, about 85 ppb, about 90 ppb, about 95 ppb, about 100 ppb, etc.). In some embodiments, the de-oiled lost circulation material may be present in the treatment fluid in an amount of from about 10 ppb to about 40 ppb. In some embodiments, the de-oiled lost circulation material may be present in an amount of from about 15 ppb to about 30 ppb.

In certain embodiments, the treatment fluids of the present disclosure may include additional lost circulation materials or bridging agents. Examples of additional lost circulation materials or bridging agents suitable for certain embodiments of the present disclosure include, but are not limited to ground marble, resilient graphitic carbon, walnut shells, calcium carbonate, magnesium carbonate, limestone, dolomite, iron carbonate, iron oxide, calcium oxide, magnesium oxide, perborate salts, and the like, and any combination thereof. In certain embodiments, additional lost circulation materials or bridging agents may include, but are not limited to, BARACARB® particulates (ground marble, available from Halliburton Energy Services, Inc.) including BARACARB® 5, BARACARB® 25, BARACARB® 50, BARACARB® 150, BARACARB® 600, BARACARB® 1200; STEELSEAL® particulates (resilient graphitic carbon, available from Halliburton Energy Services, Inc.) including STEELSEAL® powder, STEELSEAL® 50, STEELSEAL® 150, STEELSEAL® 400 and STEELSEAL® 1000; WALL-NUT® particulates (ground walnut shells, available from Halliburton Energy Services, Inc.) including WALL-NUT® M, WALL-NUT® coarse, WALL-NUT® medium, and WALL-NUT® fine; BARAPLUG® (sized salt water, available from Halliburton Energy Services, Inc.) including BARAPLUG® 20, BARAPLUG® 50, and BARAPLUG® 3/300; BARAFLAKE® (calcium carbonate and polymers, available from Halliburton Energy Services, Inc.).

In some embodiments, the treatment fluids of the present disclosure optionally may include a weighting agent. Examples of suitable weighting agents include, but are not limited to barite, hematite, calcium carbonate, magnesium carbonate, iron carbonate, zinc carbonate, manganese tetraoxide, ilmenite, NaCl, KCl, $CaCl_2$, formate salts, and any combination thereof. These weighting agents may be at least partially soluble or insoluble in the treatment fluid. In some embodiments, a weighting agent may be present in the treatment fluids in an amount of from about 1% to about 60% by weight of the treatment fluid (e.g., about 5%, about 10%, about 15%, about 20%, about 25%, about 30%, about 35%, about 40%, about 45%, about 50%, about 55%, etc.). In some embodiments, the weighting agents may be present in the treatment fluids in an amount of from about 1% to about 35% by weight of the treatment fluid. In some embodiments, the weighting agent may be present in the treatment fluids in an amount of from about 1% to about 10% by weight of the treatment fluid. Alternatively, the amount of weighting agent may be expressed by weight of dry solids. For example, the weighting agent may be present in an amount of from about 1% to about 99% by weight of dry solids (e.g., about 1%, about 5%, about 10%, about 20%, about 30%, about 40%, about 50%, about 60%, about 70%, about 80%, about 90%, about 99%, etc.). In some embodiments, the weighting agent may be present in an amount of from about 1% to about 20% and, alternatively, from about 1% to about 10% by weight of dry solids.

Certain components of the treatment fluid may be provided as a "dry mix" to be combined with a base fluid and/or other components prior to or during introducing the treatment fluid into the subterranean formation. In some embodiments, dry mix compositions may be designed to include a base fluid in an amount from about 1 to about 20 gallons per 94-lb sack of dry blend (gal/sk). In certain embodiments, dry mix compositions may be suitable for base fluids in the amount of 10 gal/sk. In some embodiments, dry mix compositions may be suitable for base fluids in the amount of 13.5 gal/sk. Embodiments of the treatment fluids of the present disclosure may be prepared in accordance with any suitable technique. In some embodiments, the desired quantity of water may be introduced into a mixer followed by the dry blend. The dry blend may include the lost circulation material and additional solid additives, for example. Additional liquid additives, if any, may be added to the base fluid as desired prior to, or after, combination with the dry blend. This mixture may be agitated for a sufficient period of time to form a slurry. It will be appreciated by those of ordinary skill in the art, with the benefit of this disclosure, other suitable techniques for preparing treatment fluids may be used in accordance with embodiments of the present disclosure.

In certain embodiments, the treatment fluids and lost circulation materials of the present disclosure may be effective over a range of pH levels. For example, in certain embodiments, the de-oiled lost circulation materials of the present disclosure may provide effective loss zone treatment from a pH of about 7 to about 12. Additionally, the treatment fluids of the present disclosure may be suitable for a variety of subterranean formations, including, but not limited to shale formations and carbonate formations. In some embodiments, the treatment fluids of the present disclosure may have a density of from about 0.5 grams per cubic centimeter (g/cc) to about 4.0 g/cc, alternatively from about 0.8 g/cc to about 3 g/cc, alternatively from about 1.0 g/cc to about 2.5 g/cc. The density may be measured by any suitable methodology.

In some embodiments, the methods of the present disclose may include introducing at least a portion of the treatment fluid within a loss zone or other flowpath through which the flow of fluids may be desirably reduced or ceased. In some embodiments, the treatment fluid may be introduced to the wellbore to prevent the loss of aqueous or non-aqueous fluids into loss zones such as voids, vugular zones, perforations, and natural or induced fractures.

The compositions used in the methods of the present disclosure may include any aqueous or non-aqueous base fluid known in the art. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods and compositions of the present disclosure may include water from any source. Such aqueous fluids may include fresh water, salt water (e.g., water containing one or more salts dissolved therein), brine (e.g., saturated salt water), seawater, oil-in-water emulsions, or any combination thereof. The aqueous fluids may include one or more ionic species, such as those formed by salts dissolved in water. For example, seawater and/or produced water may include a variety of divalent cationic species dissolved therein. Examples of suitable oleaginous fluids that may be included in the oleaginous-based fluids include, but are not limited to, α-olefins, internal olefins, alkanes, aromatic solvents, cycloalkanes, liquefied petroleum gas, kerosene, diesel oils, crude oils, gas oils, fuel oils, paraffin oils, mineral oils, low-toxicity mineral oils, olefins, esters, amides, synthetic oils (e.g., polyolefins), polydiorganosiloxanes, siloxanes, organosiloxanes, ethers, acetals, dialkylcarbonates, hydrocarbons, and combinations thereof.

In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. In an embodiment, the amount of base fluid present in the treatment fluid may be from about 50 to about 95 percent by weight (wt. %) of the treatment fluid, alternatively, from about 70 wt. % to about 90 wt. %, alternatively, from about 70 wt. % to about 85 wt. %.

In certain embodiments, the methods and compositions of the present disclosure optionally may include any number of additional additives. Examples of such additional additives include, but are not limited to, salts, surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, flocculants, $H_2S$ scavengers, $CO_2$ scavengers, oxygen scavengers, lubricants, viscosifiers, breakers, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the treatment fluid may contain rheology (viscosity and gel strength) modifiers and stabilizers. A person skilled in the art, with the benefit of this disclosure, will recognize the types of additives that may be included in the fluids of the present disclosure for a particular application.

The methods and compositions of the present disclosure can be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments. In certain embodiments, a treatment fluid may be introduced into a subterranean formation. In some embodiments, the treatment fluid may be introduced into a wellbore that penetrates a subterranean formation. In certain embodiments, a wellbore may be drilled and the treatment fluid may be circulated in the wellbore during, before, or after the drilling. In some embodiments, the treatment fluid may be introduced at a pressure sufficient to create or enhance one or more fractures within the subterranean formation (e.g., hydraulic fracturing).

The methods and compositions of the present disclosure may directly or indirectly affect one or more components or pieces of equipment associated with the preparation, delivery, recapture, recycling, reuse, and/or disposal of the compositions of the present disclosure. For example, the methods and compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the compositions of the present disclosure. The methods and compositions of the present disclosure may also directly or indirectly affect any transport or delivery equipment used to convey the fluid to a well site or downhole such as, for example, any transport vessels, conduits, pipelines, trucks, tubulars, and/or pipes used to compositionally move fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, and/or combinations thereof, and the like. For example, and with reference to FIG. 1, the lost circulation materials of the present disclosure may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates wellbore fluid 122 (e.g., a drilling fluid or a lost circulation pill described herein) through a feed pipe 124 and to the kelly 110, which conveys the wellbore fluid 122 downhole through the interior of the drill string 108 and through one or more orifices in the drill bit 114 (or optionally through a bypass or ports (not shown) along the drill string and above the drill bit 114). The wellbore fluid 122 is then circulated back to the surface via an annulus 126 defined between the drill string 108 and the walls of the wellbore 116. At the surface, the recirculated or spent wellbore fluid 122 exits the annulus 126 and may be conveyed to one or more fluid processing unit(s) 128 via an interconnecting flow line 130. After passing through the fluid processing unit(s) 128, a "cleaned" wellbore fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. One or more of the de-oiled lost circulation materials of the present disclosure may be added to the wellbore fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the de-oiled lost circulation materials of the present disclosure may be added to the wellbore fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the de-oiled lost circulation materials of the present disclosure may be stored, reconditioned, and/or regulated until added to the wellbore fluid 122.

As mentioned above, the de-oiled lost circulation materials of the present disclosure may directly or indirectly affect the components and equipment of the drilling assembly 100. For example, the de-oiled lost circulation materials of the present disclosure may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s) 128 may further include one or more sensors, gauges, pumps, compressors, and the like used store, monitor, regulate, and/or recondition the exemplary lost circulation materials.

The de-oiled lost circulation materials of the present disclosure may directly or indirectly affect the pump 120, which representatively includes any conduits, pipelines, trucks, tubulars, and/or pipes used to fluidically convey the lost circulation materials downhole, any pumps, compressors, or motors (e.g., topside or downhole) used to drive the lost circulation materials into motion, any valves or related joints used to regulate the pressure or flow rate of the lost circulation materials, and any sensors (i.e., pressure, temperature, flow rate, etc.), gauges, and/or combinations thereof, and the like. The de-oiled lost circulation materials of the present disclosure may also directly or indirectly affect the mixing hopper 134 and the retention pit 132 and their assorted variations.

The de-oiled lost circulation materials of the present disclosure may also directly or indirectly affect the various downhole equipment and tools that may come into contact with the lost circulation materials such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The de-oiled lost circulation materials of the present disclosure may also directly or indirectly affect any downhole heat exchangers, valves and corresponding actuation devices, tool seals, packers and other wellbore isolation devices or components, and the like associated with the wellbore 116. The de-oiled lost circulation materials of the present disclosure may also directly or indirectly affect the drill bit 114, which may include, but is not limited to roller cone bits, PDC bits, natural diamond bits, any hole openers, reamers, coring bits, etc.

The methods and compositions of the present disclosure may also directly or indirectly affect the various downhole equipment and tools that may come into contact with the fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. In some embodiments, the treatment fluid is introduced into a wellbore using one or more pumps.

An embodiment of the present disclosure is a method including: introducing a first treatment fluid including a base fluid and a de-oiled plant material into a wellbore penetrating at least a portion of a subterranean formation including a loss zone; and allowing the de-oiled plant material to at least partially plug the loss zone.

In one or more embodiments described above, the de-oiled plant material comprises plant material selected from the group consisting of: peanut, coconut, soybean, sunflower, cottonseed, safflower, palm, rapeseed, corn, olive, sesame, almond, walnut, mustard, rice bran, jatropha, microalgae, neem, pongamia, rubber seed, mahua, silk-cotton tree, a derivative of any of the foregoing, and any combination thereof. In one or more embodiments described above, the de-oiled plant material includes a de-oiled cake of the plant material from which an oil has been extracted. In one or more embodiments described above, the de-oiled plant material is present in the treatment fluid in an amount from about 1 ppb to about 100 ppb. In one or more embodiments described above, the de-oiled plant material is biodegradable. In one or more embodiments described above, the de-oiled plant material is an edible oil industry byproduct or a non-edible oil industry byproduct. In one or more embodiments described above, the de-oiled plant material at least partially degrades in the wellbore in response to a wellbore condition. In one or more embodiments described above, the de-oiled plant material includes particles sized within a range of from about 1,250 U.S. mesh to about 5 U.S. mesh. In one or more embodiments described above, the loss zone includes at least one microfracture having a fracture width or flow opening size in the range of from about 1 micron to about 2,000 microns. In one or more embodiments described above, the method further includes introducing a second treatment fluid including an acid into the wellbore; and allowing the second treatment fluid to contact the de-oiled plant material in the wellbore, wherein the de-oiled plant material at least partially degrades in response to contacting the second treatment fluid.

In another embodiment, the present disclosure provides introducing a first treatment fluid including a base fluid and a de-oiled plant material into a wellbore penetrating at least a portion of a subterranean formation; forming a filter cake or a plug including at least a portion of the de-oiled plant material in at least the portion of the subterranean formation; introducing a second treatment fluid including an acid in the wellbore; and allowing the second treatment fluid including an acid to contact at least a portion of the filter cake or plug, wherein at least the portion of the filter cake or plug at least partially degrades in response to contacting the second treatment fluid.

In one or more embodiments described above, the second treatment fluid includes an organic acid. In one or more embodiments described above, the filter cake or plug is formed in a production zone of the subterranean formation. In one or more embodiments described above, the de-oiled plant material includes plant material selected from the group consisting of: peanut, coconut, soybean, sunflower, cottonseed, safflower, palm, rapeseed, corn, olive, sesame, almond, walnut, mustard, rice bran, jatropha, microalgae, neem, pongamia, rubber seed, mahua, silk-cotton tree, a derivative of any of the foregoing, and any combination thereof. In one or more embodiments described above, the de-oiled plant material is an edible oil industry byproduct or a non-edible oil industry byproduct. In one or more embodiments described above, the de-oiled plant material includes particles sized within a range of from about 1,250 U.S. mesh to about 5 U.S. mesh. In one or more embodiments described above, the de-oiled plant material includes a de-oiled cake of the plant material from which an oil has been extracted.

In another embodiment, the present disclosure provides a composition including an invert emulsion base fluid and a lost circulation material including a de-oiled cake of a plant material from which an edible oil has been extracted.

In one or more embodiments described above, the composition further includes a bridging agent selected from the group consisting of: ground marble, resilient graphitic carbon, a nut shell, calcium carbonate, magnesium carbonate, limestone, dolomite, iron carbonate, iron oxide, calcium oxide, magnesium oxide, perborate salts, and any combination thereof. In one or more embodiments described above, the de-oiled plant material includes particles sized within a range of from about 1,250 U.S. mesh to about 5 U.S. mesh.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Figure 2:
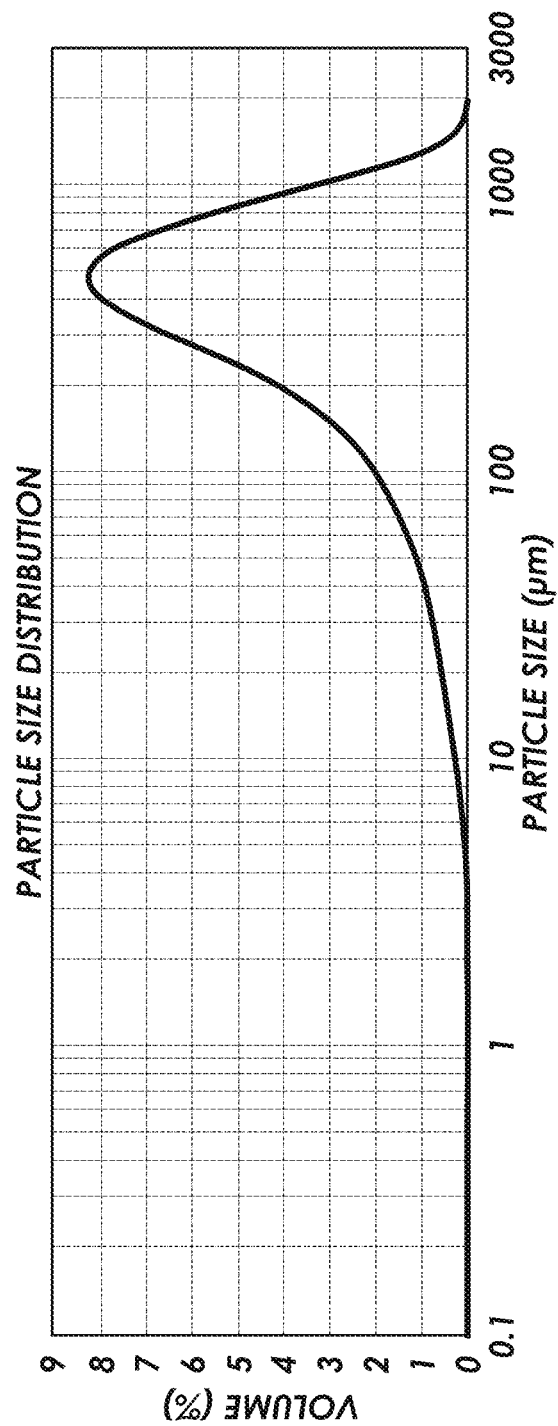
FIG. 2 is a particle size distribution curve for a lost circulation material in accordance with certain embodiments of the present disclosure.

The following examples tested the plugging effectiveness and acid solubility of a de-oiled peanut cake powder lost circulation material. The material was prepared by grinding a de-oiled peanut cake obtained as a byproduct of the peanut oil industry into a powder. FIG. 2 illustrates the particle size distribution of the powdered de-oiled peanut cake in microns. Table 1 shows the particle size distribution for the powdered de-oiled peanut cake in volume percent under micron size. Table 2 shows the summary of the particle size distribution for the powdered de-oiled peanut cake as d10/d50/d90 values.

TABLE 1

Particle Size Distribution of Powdered De-Oiled Peanut Cake in Volume Percent under Micron Size

| Size (μm) | Vol Under % |
| --- | --- |
| 0.010 | 0.00 |
| 0.011 | 0.00 |
| 0.013 | 0.00 |
| 0.015 | 0.00 |
| 0.017 | 0.00 |
| 0.020 | 0.00 |
| 0.023 | 0.00 |
| 0.026 | 0.00 |
| 0.030 | 0.00 |
| 0.035 | 0.00 |
| 0.040 | 0.00 |
| 0.046 | 0.00 |
| 0.062 | 0.00 |
| 0.060 | 0.00 |
| 0.069 | 0.00 |
| 0.079 | 0.00 |
| 0.091 | 0.00 |
| 0.105 | 0.00 |
| 0.120 | 0.00 |
| 0.138 | 0.00 |
| 0.158 | 0.00 |
| 0.182 | 0.00 |
| 0.209 | 0.00 |
| 0.240 | 0.00 |
| 0.275 | 0.00 |
| 0.316 | 0.00 |
| 0.363 | 0.00 |
| 0.417 | 0.00 |
| 0.479 | 0.00 |
| 0.550 | 0.00 |
| 0.631 | 0.00 |
| 0.724 | 0.00 |
| 0.832 | 0.00 |
| 0.955 | 0.00 |
| 1.096 | 0.00 |
| 1.259 | 0.00 |
| 1.445 | 0.00 |
| 1.660 | 0.00 |
| 1.905 | 0.00 |
| 2.188 | 0.00 |
| 2.512 | 0.00 |
| 2.884 | 0.00 |
| 3.311 | 0.00 |
| 3.802 | 0.00 |
| 4.365 | 0.00 |
| 5.012 | 0.03 |
| 5.754 | 0.13 |
| 6.607 | 0.26 |
| 7.586 | 0.44 |

TABLE 1-continued

Particle Size Distribution of Powdered De-Oiled
Peanut Cake in Volume Percent under Micron Size

| Size (µm) | Vol Under % |
|---|---|
| 8.710 | 0.67 |
| 10.000 | 0.95 |
| 11.482 | 1.28 |
| 13.183 | 1.65 |
| 15.136 | 2.06 |
| 17.378 | 2.51 |
| 19.953 | 3.01 |
| 22.909 | 3.55 |
| 26.303 | 4.13 |
| 30.200 | 4.78 |
| 34.674 | 5.49 |
| 39.811 | 6.29 |
| 45.709 | 7.17 |
| 52.481 | 8.17 |
| 60.256 | 9.28 |
| 69.183 | 10.52 |
| 79.433 | 11.92 |
| 91.201 | 13.49 |
| 104.713 | 15.25 |
| 120.226 | 17.26 |
| 138.038 | 19.54 |
| 158.409 | 22.17 |
| 181.970 | 25.24 |
| 208.930 | 28.85 |
| 239.883 | 33.11 |
| 275.423 | 38.09 |
| 316.228 | 43.84 |
| 363.078 | 50.30 |
| 416.569 | 57.34 |
| 478.630 | 64.73 |
| 549.541 | 72.12 |
| 630.957 | 79.16 |
| 724.436 | 85.46 |
| 831.764 | 90.71 |
| 954.993 | 94.72 |
| 1096.478 | 97.46 |
| 1258.925 | 99.06 |
| 1445.440 | 99.80 |
| 1659.587 | 99.97 |
| 1905.461 | 100.00 |
| 2157.762 | 100.00 |
| 2511.835 | 100.00 |
| 2884.032 | 100.00 |
| 3311.311 | 100.00 |
| 3801.894 | 100.00 |
| 4365.158 | 100.00 |
| 5011.872 | 100.00 |
| 5754.399 | 100.00 |
| 6606.934 | 100.00 |
| 7585.776 | 100.00 |
| 8709.636 | 100.00 |
| 10000.000 | 100.00 |

TABLE 2

Summary of Particle Size Distribution
of Powdered De-Oiled Peanut Cake

| D-Value | Microns |
|---|---|
| D10 | 65.42 |
| D50 | 366.88 |
| D90 | 814.80 |

Example 1

In this example, the effectiveness of the powdered de-oiled peanut cake as a lost circulation material was compared against other lost circulation materials using a permeability plugging apparatus in accordance with the American Petroleum Institute's Recommended Practices 13B-1 (Annex J) and 13B-2. The other tested materials were FLC 2000® lost circulation material, a blend of modified polymer and other cellulosic materials, and FLC® Supreme lost circulation material, a blend of cellulosic fibers and granules and other materials, both available from Impact Fluid Solutions. Each lost circulation material was tested at a concentration of 20 pounds per barrel (ppb) in a 20 pounds per gallon (ppg) INNOVERT® fluid, an invert emulsion oil-based mud. The tests were run for 30 minutes at 150° F. and a pressure differential of 1,000 psi for three different disks with varying slot sizes: 200 microns, 500 microns, and 1,000 microns. After 30 minutes, the amount of fluid loss through the slots was measured in milliliters. Table 3 shows the amount of fluid loss at each slot size for each lost circulation material.

TABLE 3

Plugging Test Fluid Loss Results

| Slot size (micron) | De-oiled peanut cake powder | FLC-2000 ® | FLC ® Supreme |
|---|---|---|---|
| 200 | 0.0 ml | 0.5 ml | 0.0 ml |
| 500 | 1.0 ml | 2.0 ml | 1.0 ml |
| 1000 | 15.0 ml | Unplugged | 10.0 ml |

Figure 3A:
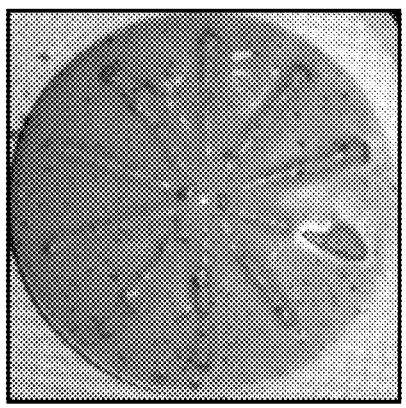
FIGS. 3A-C are photographs illustrating slotted disks of various sizes after a plugging test using lost circulation materials in accordance with certain embodiments of the present disclosure.
Figure 3B:
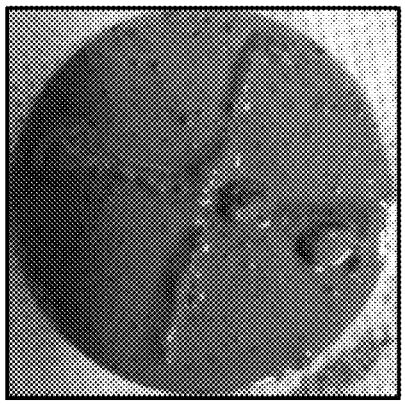
Figure 3C:
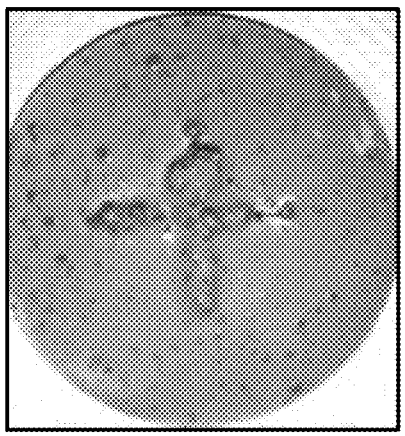

As shown above, the de-oiled peanut cake powder provided effective fluid loss prevention at all slot sizes, and was as effective or more effective than all of the other lost circulation materials for the 200 and 500 micron slot sizes. FIGS. 3A-C illustrate the plugged slots for the de-oiled peanut cake powder tests.

Example 2

Figure 4A:
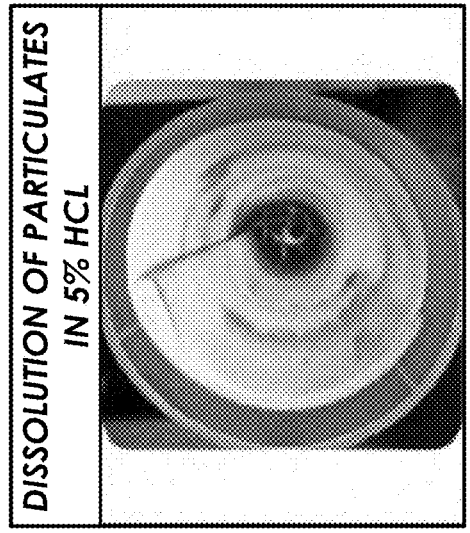
FIGS. 4A-C are photographs illustrating residue left by lost circulation materials of the present disclosure after acid dissolution and filtration tests in accordance with certain embodiments of the present disclosure.
Figure 4B:
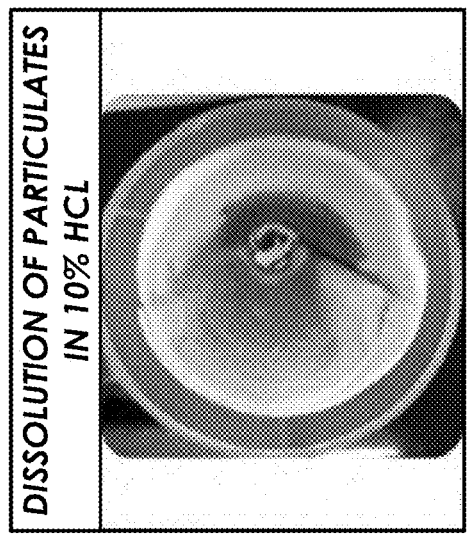
Figure 4C:
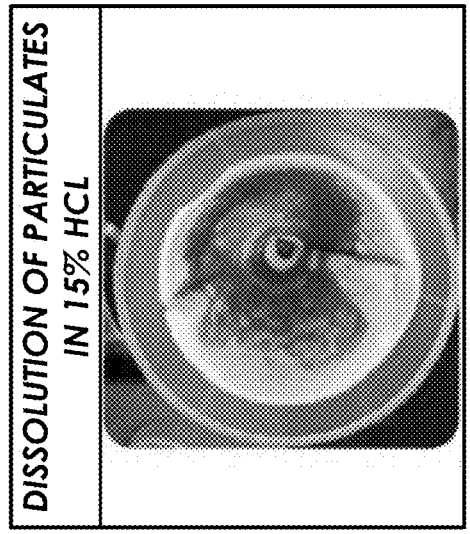

In this example, the acid solubility of the de-oiled peanut cake powder was tested in an acid dissolution test. One gram of the de-oiled peanut cake powder was added to 5%, 10%, and 15% hydrochloric acid (HCl) and held at 167° F. for 6 hours. Each acid solution was then then filtered through Whatman No. 41 paper (filter paper having a particle retention size of 20 microns) and the residue caught by the filter was weighed. Table 4 shows the residue weight and percent dissolution for the de-oiled peanut cake powder at each HCl concentration. FIGS. 4A-C show the residue left on the filter paper after filtration of each solution.

TABLE 4

Acid Dissolution Test Results

| HCl Concentration | Initial Weight (g) | Residue Weight after 6 hours (g) | % Dissolution after 6 hours |
|---|---|---|---|
| 5% | 1.00 | 0.23 | 77% |
| 10% | 1.00 | 0.16 | 84% |
| 15% | 1.00 | 0.12 | 88% |

As shown, over 75% of the de-oiled peanut cake powder particles dissolved in 5% HCl after 6 hours, and even more dissolved at higher acid concentrations. These results demonstrate that the de-oiled peanut cake powder is highly soluble in acid.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   introducing a first treatment fluid comprising a base fluid and a de-oiled cake of a plant material from which an oil has been extracted into a wellbore penetrating at least a portion of a subterranean formation comprising a loss zone located within a production zone, wherein the plant material is a waste product from an oil processing industry, and wherein the plant material is selected from the group consisting of: peanut, soybean, sunflower, cottonseed, corn, olive, sesame, mustard, neem, a derivative of any of the foregoing, and any combination thereof;
   allowing the de-oiled cake of the plant material to at least partially plug the loss zone; and
   contacting the de-oiled cake of the plant material in the production zone with an acid, wherein at least 75% by weight of the de-oiled cake of the plant material is degraded by the acid.

2. The method of claim 1, wherein the de-oiled cake of the plant material is present in the treatment fluid in an amount from about 1 ppb to about 100 ppb.

3. The method of claim 1, wherein the de-oiled cake of the plant material is biodegradable.

4. The method of claim 1, wherein the de-oiled cake of the plant material at least partially degrades in the wellbore in response to a wellbore condition.

5. The method of claim 1, wherein the de-oiled cake of the plant material comprises particles sized within a range of from about 1,250 U.S. mesh to about 5 U.S. mesh.

6. The method of claim 1, wherein the loss zone comprises at least one microfracture having a fracture width or flow opening size in the range of from about 1 micron to about 2,000 microns.

7. The method of claim 1, further comprising:
   introducing a second treatment fluid comprising the acid into the wellbore.

8. A method comprising:
   introducing a first treatment fluid comprising a base fluid and a de-oiled cake of a plant material from which an oil has been extracted into a wellbore penetrating at least a portion of a subterranean formation, wherein the plant material is a waste product from an oil processing industry, and wherein the plant material is selected from the group consisting of: peanut, soybean, sunflower, cottonseed, corn, olive, sesame, mustard, neem, a derivative of any of the foregoing, and any combination thereof;
   forming a filter cake or a plug comprising at least a portion of the de-oiled cake of the plant material in a production zone within the portion of the subterranean formation;
   introducing a second treatment fluid comprising an acid in the wellbore; and
   allowing the second treatment fluid comprising an acid to contact at least a portion of the filter cake or plug, wherein at least 75% by weight of the filter cake or plug at least partially degrades in response to contacting the second treatment fluid.

9. The method of claim 8, wherein the second treatment fluid comprises an organic acid.

10. The method of claim 8, wherein the de-oiled cake of the plant material comprises particles sized within a range of from about 1,250 U.S. mesh to about 5 U.S. mesh.

11. The method of claim 1, wherein the de-oiled cake of the plant material has at least 85% of the oil extracted from the plant material.

12. The method of claim 8, wherein the de-oiled cake of the plant material has at least 85% of the oil extracted from the plant material.

* * * * *